March 3, 1959 H. A. SCHNEIDER 2,876,352

SELF-CORRECTING PULSE CIRCUITS

Filed Dec. 27, 1955 3 Sheets-Sheet 1

INVENTOR
H. A. SCHNEIDER
BY
Alan C. Rose
ATTORNEY

March 3, 1959 — H. A. SCHNEIDER — 2,876,352

SELF-CORRECTING PULSE CIRCUITS

Filed Dec. 27, 1955 — 3 Sheets-Sheet 2

INVENTOR
H. A. SCHNEIDER
BY Alan C. Rose
ATTORNEY

March 3, 1959 H. A. SCHNEIDER 2,876,352

SELF-CORRECTING PULSE CIRCUITS

Filed Dec. 27, 1955 3 Sheets-Sheet 3

INVENTOR
H. A. SCHNEIDER
BY
Alan C. Rose
ATTORNEY 2,876,352
Patented Mar. 3, 1959

2,876,352

SELF-CORRECTING PULSE CIRCUITS

Herbert A. Schneider, Englewood, N. J., assignor to Bell Telephone Laboratories, Incorporated, New York, N. Y., a corporation of New York Application December 27, 1955, Serial No. 555,556
8 Claims. (Cl. 250—27)

This invention relates to self-correcting electrical circuits, and more particularly to self-correcting circuits for computers or similar systems in which delay lines, or registers, are employed.

In the field of synchronous electrical computers, frequency division circuits are often employed to obtain control pulses which recur at submultiples of the computer base or "clock" frequency. In these circuits, a pulse may be applied to a loop circuit including a delay line, and the successive appearances of the pulse at the output of the delay or memory loop circuit establish the repetition rate of the control pulses. Because the initiation and synchronization of various computer operations depend on the availability of these single pulses occurring cyclically at accurately timed intervals, the frequency division circuits should be virtually failure proof.

Accordingly, an important object of the present invention is to improve the reliability of frequency division circuits.

The foregoing object is accomplished by the use of three frequency division circuits which operate concurrently and which correct each other. Thus, for example, if there is a pulse present in two of the three circuits and not in the third circuit, an additional pulse is inserted in the third circuit. Similarly, an extraneous pulse which is present in a single one of the three circuits is promptly eliminated.

In a preferred embodiment of the invention, the frequency division circuits include constant capacity memory loops; that is, memory loops are employed which only circulate a predetermined number of pulses per cycle. When this type of delay loop is employed, the correction network may take the form of three simple coincidence networks, or And units, interconnecting the output of each pair of delay loops with the remaining delay loop. Thus, when a pulse is missing from one delay loop at a given instant, but is present in the other two loops, a pulse is supplied to the first delay loop by the coincidence network. The necessity for deleting extraneous pulses which are present in only one of the three loops is obviated by the nature of the constant capacity delay loops, which will not circulate the extraneous pulses when the correct pulse sequence is continuously supplied to it from the other two delay loops.

In considering the advantages of the present circuitry, it should be noted that it has been proposed heretofore to employ simple two out of three output circuits (see W. H. Burkhart, Patent 2,628,346, for example). However, the present circuits are not merely directed to majority rule circuits per se, but involve the combination of three circulating memory loops with dynamic correction circuitry. More specifically, some of the advantages of the circuits described above are the prompt elimination of transient errors, and the continued correct timing of output pulses even when one of the three frequency division circuits fails permanently. Thus, faulty circuit components may be replaced without interrupting the operation of the computer circuitry.

An important feature of the self-correcting frequency division circuitry is the small number of circuit components which are required when constant capacity memory loops are employed. Initially, the use of constant capacity memory loops reduces the amount of delay required in each division circuit by one-half, as compared with division circuits employing closed delay loops. In addition, as mentioned above, correction circuitry is required only for inserting pulses and not for deleting extra pulses. Accordingly, the cumulative savings of packages secured through the use of constant capacity memory loops makes the additional cost of securing virtually failure proof operation much less than expected.

In addition to frequency division circuits, extreme reliability is also desirable in other computer circuits, such as storage registers which contain critical information. Accordingly, a broader object of the invention encompasses the improvement of the reliability of pulse circuits in which delay lines or storage registers are employed. Three delay lines may still be employed, and circuits embodying the principles of "majority rule" insure the coincidence of the pulse train present in any one of the three registers with those present in the other two registers.

Other objects and various additional advantages and features of the invention will become apparent by reference to the following description taken in connection with the accompanying drawings, and from the appended claims.

Figure 1:
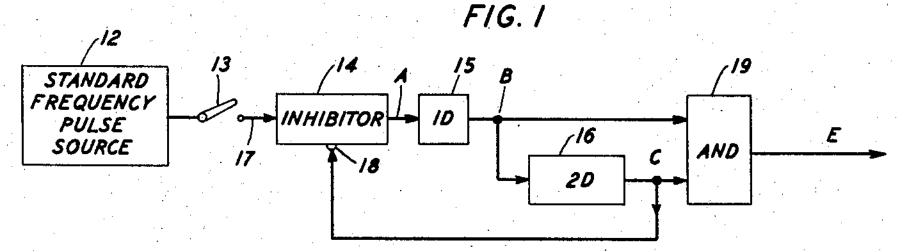
Fig. 1 is a logic circuit diagram of a frequency division circuit of the prior art.

Referring more particularly to the drawings, Fig. 1 shows a constant capacity frequency division circuit of the type disclosed in R. L. Carmichael application Serial No. 478,666, filed December 30, 1954, now Patent 2,824,228, granted February 18, 1958. Figs. 2A through 2F show pulse trains which are useful in explaining the constant capacity nature of the circuit of Fig. 1. The four pulse trains A, B, C and E in each of Figs. 2A through 2F represent pulses at the corresponding points A, B, C and E of the circuit of Fig. 1.

Figure 2A:
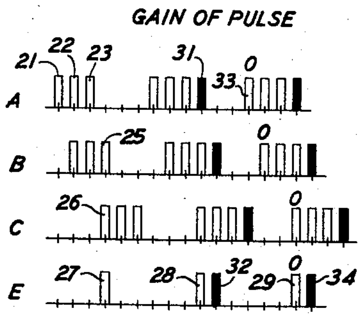
Figs. 2A through 2F are explanatory diagrams showing a series of pulse trains and illustrating the result of a transient failure in the circuit of Fig. 1.

In Fig. 1, the standard frequency pulse source 12 produces a continuous train of output pulses at a pulse repetition rate corresponding to that of the pulses in each of the groups of pulses in pulse train A of Fig. 2A, for example. The pulse repetition frequency may, for example, be three megacycles per second. The time between successive pulses such as 21 and 22 of Fig. 2A is termed a "digit time" or a "digit period."

The standard frequency pulse source 12 of Fig. 1 is connected by a switch 13 to a delay loop including the inhibitor 14, the one-digit delay line 15, and the two-digit delay line 16. The inhibit unit 14 normally passes pulses applied to a normal input lead 17. However, when pulses are applied to inhibit terminal 18, output pulses from the inhibit unit are blocked, or "inhibited." Thus, in the operation of the frequency division circuit of Fig. 1, following the closure of switch 13, pulses 21, 22 and 23 (see Fig. 2A) pass through the inhibitor 14. These three pulses pass through the delay lines 15 and 16 which have a total delay of three digit periods, and arrive successively at inhibit terminal 18 of the inhibitor 14 during the next three digit periods. Accordingly, successive groups of three pulses are transmitted through the inhibit unit 14. This mode of operation is indicated by the unshaded pulses in pulse train A of Fig. 2A.

Pulse trains from the outputs of delay lines 15 and 16 (designated B and C, respectively, in Fig. 2A) are applied to the two inputs of the And unit 19. An And unit, as its name implies, requires the energization of all input circuits to produce an output pulse. Therefore, pulses from the And unit 19 only appear at point E (see row E of Fig. 2A) when pulses are present at the outputs of both delay lines 15 and 16. Accordingly, pulse 27 in row E of Fig. 2A appears directly below pulses 25 and 26 in rows B and C, respectively. Similarly, the unshaded pulses 28 and 29 would normally appear at point E at successive six-digit period intervals.

In the preceding paragraphs, it has been demonstrated that the circuit of Fig. 1 is a 6 to 1 frequency division circuit. A more complete analysis of the properties and the mode of operation of frequency division circuits of this type is presented in the above-identified patent of R. L. Carmichael.

By reference to Figs. 2A through 2F, it will now be shown that the frequency division circuit of Fig. 1 is a constant pulse capacity delay circuit. That is, the memory loop included in the circuit always has the same number of pulses circulating through it. Thus, for example, if a pulse is inserted into the delay loop, another pulse is deleted from the circulating pulse group; and similarly, if a pulse is omitted in its propagation through the loop, another pulse will be added to maintain the same total number of pulses in the loop.

In Figs. 2A through 2F, the normal pattern of pulse propagation through the logic circuit of Fig. 1 is shown by the unshaded pulse patterns. Additional pulses which are introduced are represented by darkened pulses, and pulses which are deleted are designated by a small "*o*" immediately above the missing pulse.

The pulse trains shown in Fig. 2A indicate the result of the introduction of an extraneous pulse 31 into the delay loop of Fig. 1 at the output of the inhibit unit 14. The extra pulse 31 may result from a voltage transient, or from a temporary failure of the inhibit unit 14. This extraneous pulse is propagated through the delay units 15 and 16 and yields an extra pulse 32 at the output of the frequency divider. In addition, the first pulse 33 of the next pulse group at point A is eliminated by the presence of the extra pulse at the inhibit terminal 18 of the inhibit unit 14. The elimination of pulse 33 is indicated by a small "*o*" over this pulse. At the output E of the frequency divider, pulse 29 is also eliminated and the shaded pulse 34 is produced. The ultimate result of the extra pulse in the position shown in Fig. 2A is to shift the pulse pattern of the frequency division circuit by one digit period.

Figure 2D:
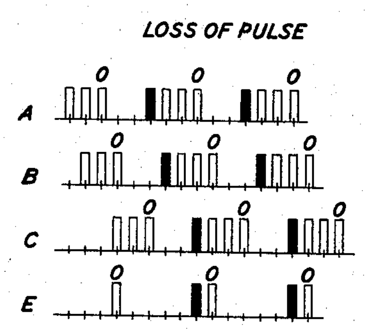
Figure 2B:
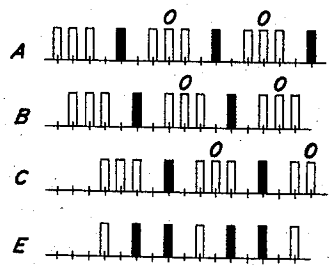
Figure 2E:
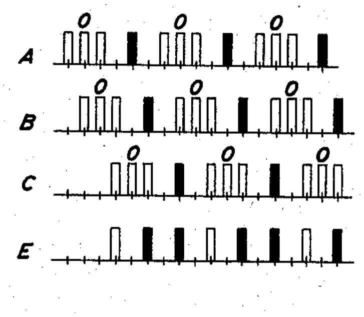
Figure 2C:
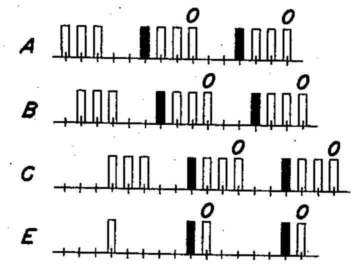
Figure 2F:
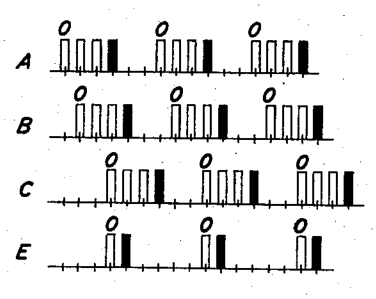

Figs. 2B and 2C show the effects of extraneous pulses introduced into the delay loop at other points in the repetitive cycle of the frequency divider. In each case, it may be noted that the insertion of an extra pulse in the delay loop results in the elimination of a pulse from the delay loop. Similarly, in Figs. 2D through 2F, the effects of eliminating a pulse at point A of Fig. 1 are shown. In each case, an extra pulse is produced and circulated through the delay loop, and the output pulse pattern at F is altered (Fig. 2E) or shifted in time (Figs. 2D and 2F).

When a single frequency division circuit is employed to control computer operations which must occur at precisely timed intervals, operational failures such as those indicated in Figs. 2A through 2F introduce serious errors into the computations. The circuit shown schematically in Fig. 3 and in logic circuit form in Fig. 4 is employed in accordance with the invention to provide essentially failure proof operation.

Figure 3:
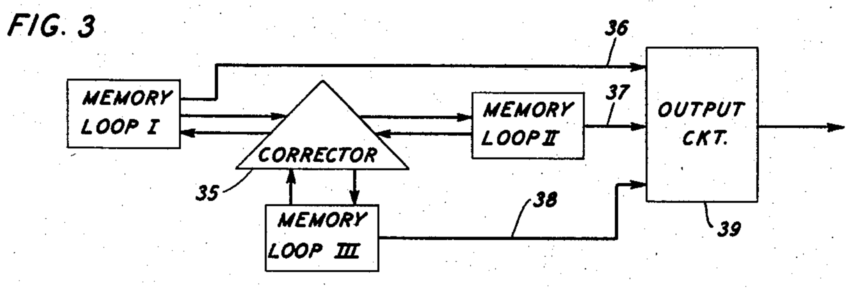
Fig. 3 is a block schematic diagram of a self-correcting memory loop circuit in accordance with the invention.

In Fig. 3, memory loops I, II and III may, for example, represent three frequency division circuits such as those shown in Fig. 1. The correction circuit 35 compares the information circulating in the memory loops on a two out of three basis, and corrects any signal which deviates from the corresponding signals in the other two memory loops. The output signals from the memory loops I, II and III are connected by leads 36, 37 and 38, respectively, to an output circuit 39. Circuit 39 produces an output signal which corresponds to that present at any two of the three leads 36, 37 and 38. Thus, successive temporary failures in different memory loops are corrected without introducing a single output error, and a permanent fault in one memory loop produces no output error unless failure also occurs in one of the other two memory loops.

Figure 4:
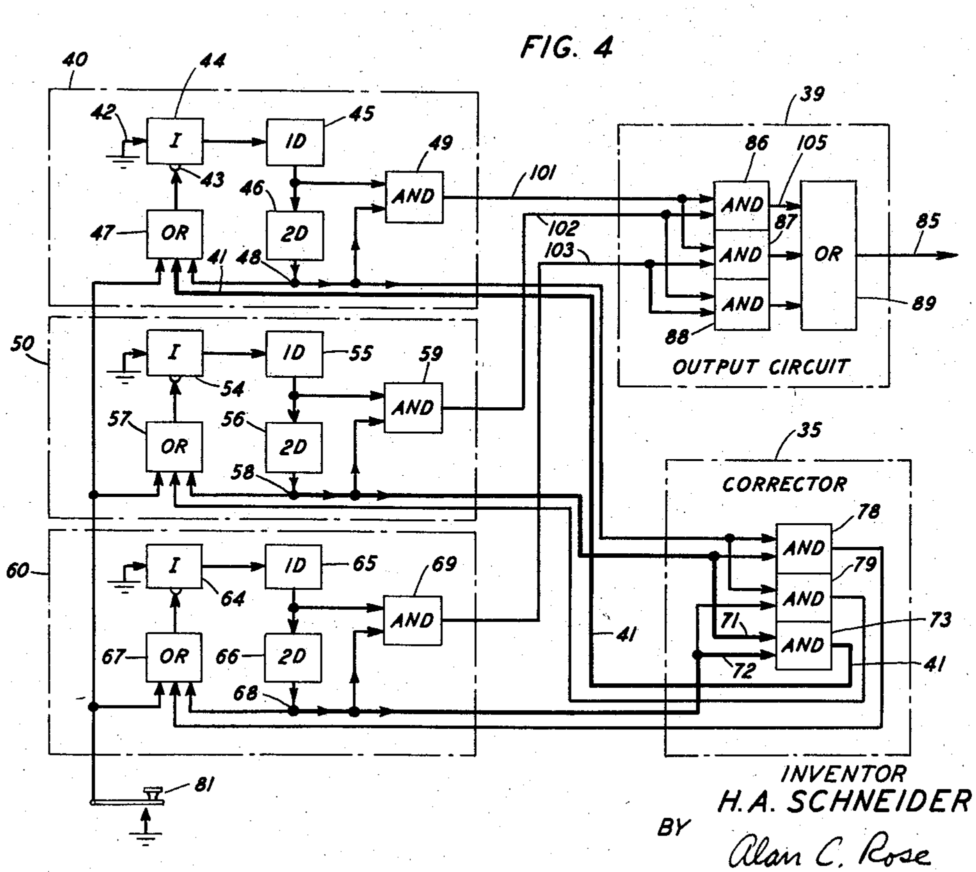
Fig. 4 is a logic circuit diagram of a self-correcting frequency division circuit.
Figure 5:
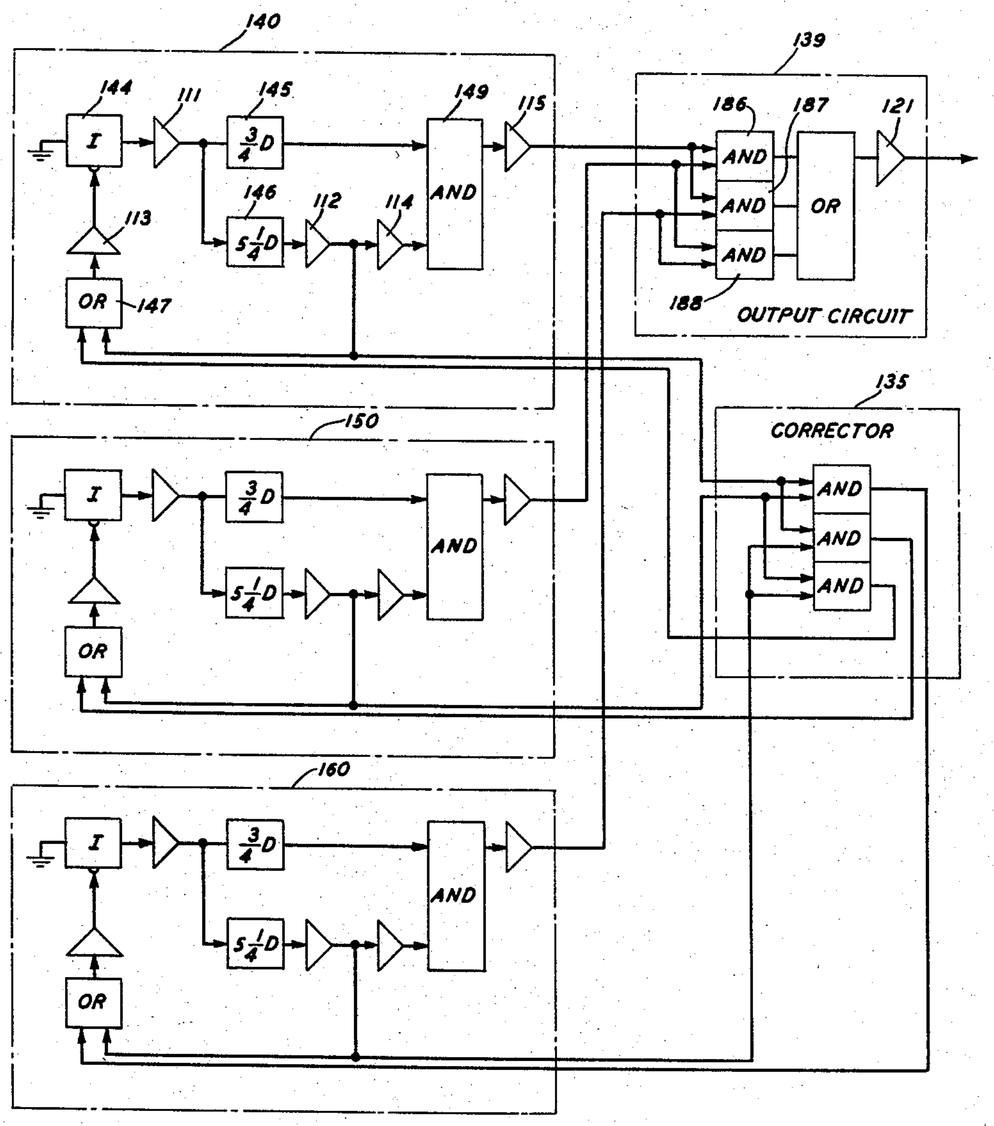
Fig. 5 is a detailed logic circuit diagram of the frequency division circuit of Fig. 4.

Figs. 4 and 5 are two versions of a basic form of self-correcting frequency division circuit which utilizes the memory loop circuit shown in Fig. 1. Fig. 4 is a generalized logic circuit diagram of a 6 to 1 frequency division circuit which may be realized in accordance with many different technologies. Fig. 5, however, is a specific form of the circuit of Fig. 4 which includes pulse regenerators and delay circuitry in accordance with the requirements of a particular technology, as described hereinafter. It should also be noted that the circuit of Fig. 5 has a 12 to 1 frequency division ratio, as compared with the 6 to 1 ratio of the circuit of Fig. 4. In Fig. 4, the circuits in the dashed line boxes 40, 50 and 60 correspond respectively to the memory loops I, II and III of Fig. 3. In addition, the output and correction circuits 35 and 39 of Fig. 4 correspond to the circuits of Fig. 3, which bear the same designations.

Comparing the component frequency division circuit 40 of Fig. 4 with that of Fig. 1, it may be observed that the inhibit unit 44, the delay lines 45 and 46, and the And unit 49 perform the same functions in Fig. 4 as the comparable logic units 14, 15, 16 and 19, respectively, of Fig. 1. The frequency division circuit 40 of Fig. 4 also includes an Or unit 47 which is connected to the input of the inhibit unit 44. An Or unit has the property that a pulse applied to any of the input circuits produces a pulse at the output of the Or unit. The Or unit 47 in circuit 40 is provided to permit the introduction of pulses from the correction circuit 35 on lead 41 in a manner to be described in detail hereinafter.

Before proceeding with a detailed description of Fig. 4, the instrumentation of the logic circuit components will be discussed briefly. The properties of Or, And, inhibit and delay units have been discussed above in the course of describing Fig. 1 and a portion of Fig. 4. These logic circuits are four of the "building blocks" or basic circuit units which may be employed by the logic circuit designer. Many realizations of these circuits have been proposed heretofore, and the present circuits are not limited to any specific form of these logic circuit units. As a specific example, one workable set of logic packages is disclosed in an article entitled "Regenerative Amplifier for Digital Computer Applications," by J. H. Felker, which appeared at pages 1584 through 1596 of the November 1952 issue of the Proceedings of the Institute of Radio Engineers (volume 40, No. 11). Another set of logic circuits which may be employed as disclosed in H. A. Schneider application Serial No. 456,648, filed September 17, 1954, and in J. H. Vogelsong application Serial No. 437,401, filed June 17, 1954.

In addition to logic circuit elements, the pulse regenerator circuits (not shown in Fig. 4) which are employed to maintain appropriate voltage levels and to insure synchronism of operations throughout the computer are disclosed in the references set forth in the preceding paragraph. A standard frequency source is applied to each pulse regenerator to accurately control the timing of output pulses from the regenerator. The input to each regenerator is normally maintained at a slightly negative voltage, and no output pulses are produced under these circumstances. However, when a positive going pulse raises the input voltage to ground potential or above, an appropriately timed output pulse is produced.

As shown in detail in Fig. 5, a pulse regenerator is associated with each inhibit unit. Pulse regenerators may also be included elsewhere in the logic circuitry as needed to supply the required power to drive the logic circuits which they precede. In Fig. 4, however, the pulse regenerators are not shown separately, but are included in the appropriate preceding logic circuits. It is therefore assumed that the inhibit unit 44, for example, includes a pulse regenerator. Thus, for the purposes of Fig. 4, all logic and delay circuits are considered to be without loss, and all of the logic circuits are considered to introduce no delay.

Returning to Fig. 4, another difference between the frequency division circuit 40 of Fig. 4 and that of Fig. 1 is the input circuit to the inhibit unit 44. In Fig. 1, a standard frequency pulse source 12 is shown connected to the normal input 17 of the inhibit unit 14. In Fig. 4, however, the normal input 42 to the inhibit unit 44 is grounded. The inhibit unit 44 includes a pulse regenerator as mentioned in the preceding paragraph, and this pulse regenerator produces properly timed output pulses when pulses applied to the regenerator raise its input potential to ground level or above. Grounding the input terminal of the inhibit unit 44 is therefore equivalent to applying pulses thereto, and output pulses are produced unless, of course, pulses are present at the inhibit terminal 43. Thus, with the exception of the correction circuits, it has been shown that the frequency division circuit 40 of Fig. 4 is substantially the same as that of Fig. 1.

The frequency division circuit 40 is substantially duplicated in the circuits included in boxes 50 and 60 in Fig. 4. To more clearly bring out the equivalency between the three circuits, the logic circuit elements in the frequency division circuits 50 and 60 have been numbered in a manner corresponding to the units of circuit 40. Thus, for example, the inhibit unit 44, the delay units 45 and 46, the Or unit 47 and the And unit 49 of circuit 40 find their counterparts in the logic circuit units 54, 55, 56, 57 and 59, respectively, of circuit 50, and in the logic circuit units 64, 65, 66, 67 and 69 of circuit 60.

The mode of operation of the corrector circuit 35 will now be considered. To illustrate the operation of circuit 35, it will be asumed that a pulse is missing from the memory loop of circuit 40 at point 48, and that this pulse is present in circuits 50 and 60 at points 58 and 68, respectively. The input and output circuits from the corrector circuit 35 which are employed in the resulting correction operation are drawn in heavy lines to distinguish them from the balance of the circuitry. In view of the pulses present at points 58 and 68, both of the input leads 71 and 72 to the And unit 73 in the corrector circuit 35 are energized. This produces an output pulse on lead 41 which is connected to the input of the Or unit 47. This effectively inserts a pulse into the memory loop of circuit 40 at the inhibiting terminal 43 of the inhibit unit 44. Accordingly, the operation of the frequency division circuit 40 is restored to normal in the manner explained above in connection with the description of Figs. 2A through 2F. It was also shown in connection with Figs. 2A through 2F that the insertion of an extra pulse results in the omission of a pulse after one frequency division cycle has elapsed. This mode of operation is a result of the constant pulse capacity nature of the delay or memory loop circuits which are employed. When the omitted pulse is restored by the process described in the preceding paragraph, the operation of the frequency division circuit is restored to normal. Thus, by employing constant capacity frequency division circuits, it is sufficient to provide a correction circuit which inserts missing pulses, and no additional circuitry need be provided to delete extra pulses.

In the preceding paragraph, it has been shown that circuits connected from points 58 and 68 to the And unit 73 supply pulses to Or unit 47 of the frequency division circuit 40, and thus correct any errors which may occur in the pulse pattern of this circuit. Similarly, circuits connected from points 48 and 58 to the And unit 78 correct errors in the frequency division circuit 60 by inserting pulses at an input of the Or unit 67; and circuits connected from points 48 and 68 to the And unit 79 correct errors in the frequency division circuit 50 by inserting pulses at an input of the Or unit 57.

The switch 81 is provided to insure initial synchronism of the three frequency division circuits 40, 50 and 60 in a proper mode, such as that shown by the unshaded pulses in Fig. 2A. When the switch 81 is closed, an input to each of the Or units 47, 57 and 67 is grounded, which grounds the inhibiting terminals of inhibit units 44, 54 and 64. The grounding of the inhibiting terminals of units 44, 54 and 64 effectively blocks output pulses from the inhibit units and clears the delay loops. When switch 81 is opened, however, pulses are produced at the outputs of all three inhibit units 44, 54 and 64, and the three division circuits are started in synchronism.

The output circuit 39 is provided to isolate the output lead 85 of the entire frequency division circuit of Fig. 4 from errors which may occur in one of the component frequency division circuits 40, 50 or 60. In the output circuit 39, the three And units 86, 87 and 88 and the Or unit 89 produce output pulses at lead 85 only when at least two of the three frequency division circuits 40, 50 and 60 produce concurrent output pulses. Thus, for example, if lead 101 from frequency division circuit 40 is energized, and leads 102 and 103 from circuits 50 and 60 are not energized, only one of the input circuits of the And units 86 and 87 are energized, and no pulse is applied to the Or unit 89. If output circuit 102 from frequency division circuit 50 is also energized, however, both inputs to the And unit 86 are energized, and an output pulse on lead 105 is transmitted through the Or unit 89 to produce an output pulse on lead 85. In view of the symmetrical circuit connections between leads 101, 102 and 103, and the And units 86, 87 and 88, it is obvious that the energization of any two of the three leads 101 through 103 produces an output pulse at lead 85, while the energization of only one of the three input circuits 101 through 103 does not produce a pulse at lead 85.

As mentioned above, the circuit of Fig. 4 does not show the pulse regenerators, which are preferably employed in logic circuitry of the present type, as separate circuit elements. In addition, in considering the timing of the pulses in the circuits of Fig. 4, it is assumed that no delay is introduced by the logic circuitry.

In the frequency division circuit of Fig. 5, the pulse regenerators mentioned above are shown separately, and the delays introduced by the regenerators are taken into consideration by reduction of the length of the associated delay lines. In addition, the self-correcting frequency division circuit of Fig. 5 has a 12 to 1 frequency division ratio, in contrast to the 6 to 1 ratio of the circuits of Figs. 1 and 4.

The logic circuitry of Fig. 5 is substantially the same as that of Fig. 4, and the designation numbers in Fig. 5 correspond to those employed in Fig. 4, with the exception that the numbers of Fig. 5 are prefixed by a "1." Thus, for example, the 12 to 1 frequency division circuits designated 140, 150 and 160 in Fig. 5 correspond to the 6 to 1 frequency division circuits 40, 50 and 60 of Fig. 4. Similarly, the corrector and output circuits 135 and 139, respectively, of Fig. 5 correspond to circuits 35 and 39 of Fig. 4.

As noted hereinabove, in connection with Figs. 1 and 4, a 6 to 1 division ratio is obtained when there are three digits of delay in the constant capacity delay loop, including the inhibit unit. It has been set forth in R. L. Carmichael Patent 2,824,228 mentioned above that the frequency division ratio is in general equal to twice the number of digits of delay included in the constant capacity memory loop. In Fig. 5, therefore, the 12 to 1 frequency division circuit 140 should include a memory loop having six digits of delay. In circuit 140, the memory loop includes inhibit unit 144, pulse regenerator 111, delay line 146, pulse regenerator 112, Or unit 147, and a third pulse regenerator 113. The system of logic circuit components employed in Fig. 5 is that described in the copending application Serial No. 456,648 of H. A. Schneider mentioned above. In this system, a delay of one-quarter digit period is introduced by each pulse regenerator. Accordingly, the three regenerators 111, 112 and 113 of frequency division circuit 140 introduce a total of three-quarters of a digit period of delay. Accordingly, the delay line 146 includes five and one-quarter digit periods of delay to bring the total delay of the memory loop up to six full digit periods. The three-quarter digit period delay line 145 is required to obtain properly phased input pulses to the And unit 149 from the regenerator 114 and from the delay line 145. The regenerative amplifier 115 is required to provide sufficient power to operate the And units 186 and 187 in the output circuit 139. The pulse regenerator 121 provides output power from the entire self-correcting frequency division circuit of Fig. 5 to drive other logic circuit components of the computer system.

The 12 to 1 frequency division circuits 150 and 160 are identical with the frequency division circuit 140 described above. In addition, the corrector and output circuits 135 and 139 perform precisely the same functions as the comparable circuits 35 and 39 of Fig. 4.

It is to be understood that the above-described arrangements are illustrative of the application of the principles of the invention. Numerous other arrangements, such as circuitry employing delay loops other than constant capacity loops with the required logic circuits for deleting as well as inserting pulses, may be devised by those skilled in the art without departing from the spirit and scope of the invention.

What is claimed is:

1. In combination, first, second and third circuit loops each including a delay line and a pulse regenerator, means for establishing identical pulse trains in each loop, a first And unit having two input circuits connected to said second and third circuit loops and having its output circuit connected to said first loop, a second And unit having two input circuits connected to said first and third circuit loops and having its output circuit connected to said second loop, and a third And unit having two input circuits connected to said first and second circuit loops and having its output circuit connected to said third loop.

2. In combination, first, second and third circuit loops each including a delay line, a pulse regenerator and an inhibit unit, means for establishing identical pulse trains in each loop, a first And unit having two input circuits connected to said second and third circuit loops and having its output circuit connected to said first loop, a second And unit having two input circuits connected to said first and third circuit loops and having its output circuit connected to said second loop, and a third And unit having two input circuits connected to said first and second circuit loops and having its output circuit connected to said third loop.

3. In a self-correcting frequency division system, three frequency division circuits each including an inhibit unit and a delay loop interconnecting the output and the inhibiting input terminal of said inhibit unit, and three And units each having its output connected to a respectively different one of said delay loops and having two inputs connected to the other two delay loops.

4. In a self-synchronizing cyclic pulse system, three pulse train modification circuits each including an inhibit unit and a delay loop interconnecting the output and the inhibiting input terminal of said inhibit unit, a first And unit having input circuits connected respectively to first and second of said delay loops and its output connected to the third delay loop, a second And unit having inputs connected respectively to said second and third delay loops and its output connected to said first delay loop, and a third And unit having its inputs connected respectively to said first and third delay loops and its output connected to said second delay loop.

5. In a self-correcting frequency division system, first, second, and third frequency division circuits each including delay loops having a constant pulse capacity, said frequency division circuits being susceptible to errors of a first type in which pulses are added to said delay loops and to errors of a second type in which pulses are deleted from said delay loops, and error correction circuitry consisting of means for correcting only one of said two types of errors in each of said frequency division circuits in accordance with the signals in the other two frequency division circuits.

6. In a self-correcting frequency division system, first, second, and third frequency division circuits each including delay loops having a constant pulse capacity, said frequency division circuits being susceptible to errors of a first type in which pulses are added to said delay loops and to errors of a second type in which pulses are deleted from said delay loops, means for correcting errors in a first one of said frequency division circuits consisting of means for sensing one of two states of said second and third frequency division circuits and for correcting only one of said types of error in said first frequency division circuit in accordance with the output of said sensing means, means for correcting errors in a second one of said frequency division circuits consisting of means for sensing one of two states of said first and third frequency division circuits and for correcting only one of said types of error in said second frequency division circuit in accordance with the output of said sensing means, and means for correcting errors in a third one of said frequency division circuits consisting of means for sensing one of two states of said first and second frequency division circuits and for correcting only one of said types of error in said third frequency division circuit in accordance with the output of said sensing means.

7. In a self-correcting cyclic pulse system, first, second, and third pulse train modification circuits each including an inhibit unit and a delay loop interconnecting the output and the inhibiting input terminal of said inhibit unit, said pulse train modification circuits being susceptible to errors of a first type in which pulses are added to said delay loops and to errors of a second type in which pulses are deleted from said delay loop, and error correction circuitry consisting of means for correcting only one of said two types of errors in each of said pulse train modification circuits in accordance with the signals in the other two pulse circuits.

8. In a self-correcting cyclic pulse system, first, second, and third pulse train modification circuits each including a constant capacity register, said pulse train modification circuits being susceptible to errors of a first type in which signals are added to said registers and to errors of a second type in which signals are deleted from said registers, and error correction circuitry consisting of means for correcting only one of said two types of errors in each of said pulse train modification circuits in accordance with the signals in the other two pulse circuits.

References Cited in the file of this patent

UNITED STATES PATENTS

| | | |
|---|---|---|
| 2,568,319 | Christensen | Sept. 18, 1951 |
| 2,628,346 | Burkhart | Feb. 10, 1953 |
| 2,813,259 | Burkhart | Nov. 12, 1957 |
| 2,824,228 | Carmichael | Feb. 18, 1958 |

FOREIGN PATENTS

| | | |
|---|---|---|
| 737,863 | Great Britain | Oct. 5, 1955 |

OTHER REFERENCES

Hamming: "Error Detecting and Error Correcting Codes," The Bell System Technical Journal, April 1950, pp. 147–160.